United States Patent [19]

Raneri

[11] Patent Number: 4,959,149
[45] Date of Patent: Sep. 25, 1990

[54] MULTIPLE TUBE SERIES MEMBRANE FILTRATION MODULE AND METHOD OF PREPARING SAME

[75] Inventor: Joseph J. Raneri, Woburn, Mass.

[73] Assignee: Koch Industries, Inc., Wichita, Kans.

[21] Appl. No.: 366,433

[22] Filed: Jun. 15, 1989

[51] Int. Cl.⁵ .................. B01D 61/14; B01D 61/18
[52] U.S. Cl. ................................ 210/636; 210/650; 210/321.7
[58] Field of Search ............ 210/294, 295, 298, 314, 210/322, 323.1, 323.2, 332, 334, 391, 396, 397, 634, 636, 649, 650, 651, 652, 791, 321.69, 321.7

[56] References Cited

U.S. PATENT DOCUMENTS 4,080,289  3/1978  Ebara et al. .................... 210/636

Primary Examiner—Frank Sever
Attorney, Agent, or Firm—Kokjer, Kircher, Bradley, Wharton, Bowman & Johnson

[57] ABSTRACT

A filtration module of tubular members in series and method of preparing same. The tubules are arranged in series and are joined by a unitary header plate together with a single end plate. This construction eliminates the need for multple components used in the prior art devices thus reducing construction and maintenance costs and opportunities for leakage, and provides for faster and more effective cleaning.

6 Claims, 2 Drawing Sheets

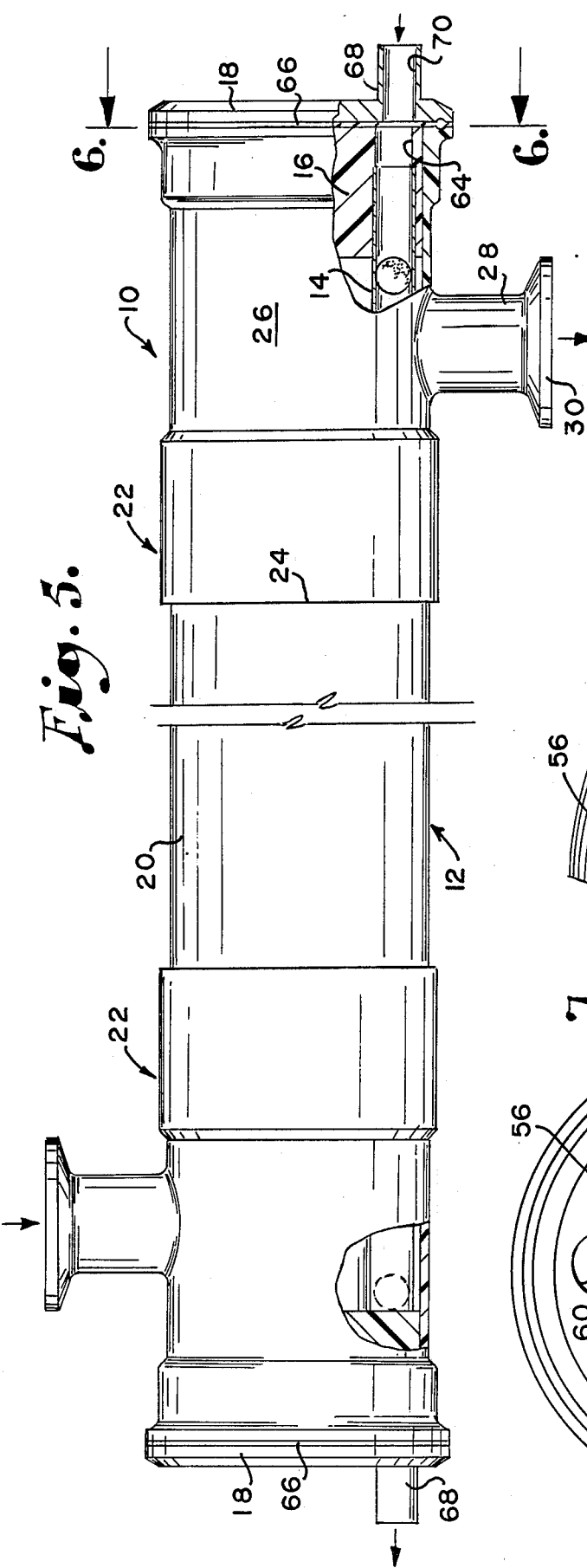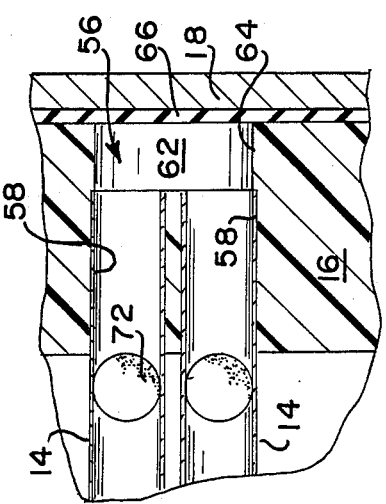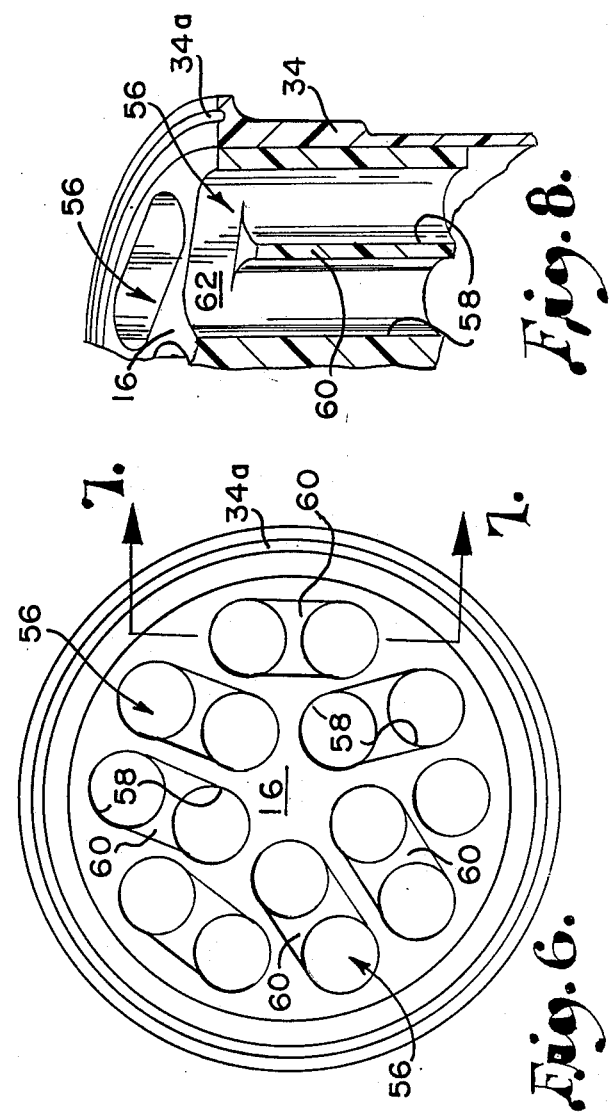

MULTIPLE TUBE SERIES MEMBRANE FILTRATION MODULE AND METHOD OF PREPARING SAME

BACKGROUND OF THE INVENTION

This invention relates generally to ultra filtration and, in particular, to tubular membranes coupled in series to present a filtration module and to a method of preparing such a module.

Semi-permeable ultra filtration membrane devices have long been employed in both high pressure reverse osmosis and low pressure ultra filtration processes and systems. Typically, the membranes are formed into tubules and grouped together inside of a cylindrical vessel. Support members hold the tubules in spaced relationship and the assembly is referred to as a module. One or more modules may be used to concentrate or separate a wide variety of liquids and solids including polymeric emulsions or latices, body fluids, aqueous emulsions and low molecular weight solids such as urea and liquid solid systems such as a whey solution containing proteinaceous components. A typical material for constructing the semi-permeable tubular membranes is cellulose acetate.

The afore-mentioned modules may be arranged with their tubules in either series or parallel relationship depending upon the demands of the filtering process for which the module is used. Typically, a number of modules are joined together to accomplish the desired filtration.

There are known advantages to modules having their tubules arranged in series as opposed to a parallel arrangement. For example, where pressure drop is not a limiting factor, the pump sizing requirements for a given number of tubules arranged in series is substantially less than for the same number of tubules arranged in parallel. Another advantage of a series module is that cleaning of the inner surface of the filtration membrane may be accomplished by inserting properly sized spong balls into the fluid stream for passage through the tubules which make up the module. This sponge ball cleaning technique cannot be utilized reliably with a parallel arranged module since there is no assurance that fluid flow will carry sponge balls to each of the individual tubules.

There are, however, known disadvantages associated with a series arranged filtration module. The series arrangement requires a number of grommets and/or expanders as well as headers or U-bends, backup plates, and clamps. A typical series arranged ultra filtration module is shown and described in U.S. Pat. No. 4,309,287 issued Jan. 5, 1982. The large number of components which has heretofore been required for a series arranged filtration module not only increases the manufacturing cost of the module significantly over comparable parallel arranged modules, but also results in substantially increased potential for leakage with attendant increased maintenance costs. Another disadvantage of prior art constructions for series arranged ultra filtration modules is that the use of grommets, expanders and U-bends create uneven surfaces along the fluid path which can cause "hangup" of sponge balls utilized to clean the module. In applications where periodic sponge ball cleaning is required, however, the series arranged module is employed.

OBJECTS OF THE INVENTION

It is, therefore, a primary object of the present invention to provide an ultra filtration module and method of preparing same wherein the ultra filtration tubules are series arranged to minimize pumping requirements, but a single unitary header together with a single end plate is employed to accomplish the series arrangement as opposed to the much larger number of components needed to present headers of the prior art.

Another important objective of my invention is to provide a series arranged filtration module and method of constructing same wherein the filtration tubules are joined by casting a potting compound in place around the tubules to assure a fluid tight seal without the need for multiple coupling components as has characterized prior art series arranged filtration modules.

Still another one of the objects of this invention is to provide a series arranged filtration module which has a much smaller number of components than previous series arranged modules thereby decreasing the opportunities for leakage within the module and reducing maintenance costs.

A very important aim of my invention is also to provide a series arranged filtration module and method of producing same which, by reason of the relatively small number of components which make up the module, is significantly less expensive to manufacture than series arranged modules of the prior art.

Other objects of the invention will be made clear or become apparent from the following description and claims when read in light of the accompanying drawing.

DESCRIPTION OF THE DRAWINGS

In the drawings.

FIG. 5 is a side elevational view with portions broken away and shown in cross-section of a filtration module constructed according to the method of the present invention;

FIG. 6 is a vertical cross-sectional view taken along line 6—6 of FIG. 5;

FIG. 7 is a vertical cross-sectional view taken along line 7—7 of FIG. 6; and

FIG. 8 is a cross-sectional view of one of the end plugs utilized in the invention.

DETAILED DESCRIPTION OF THE PREFERRED EMBODIMENT

Figure 3:
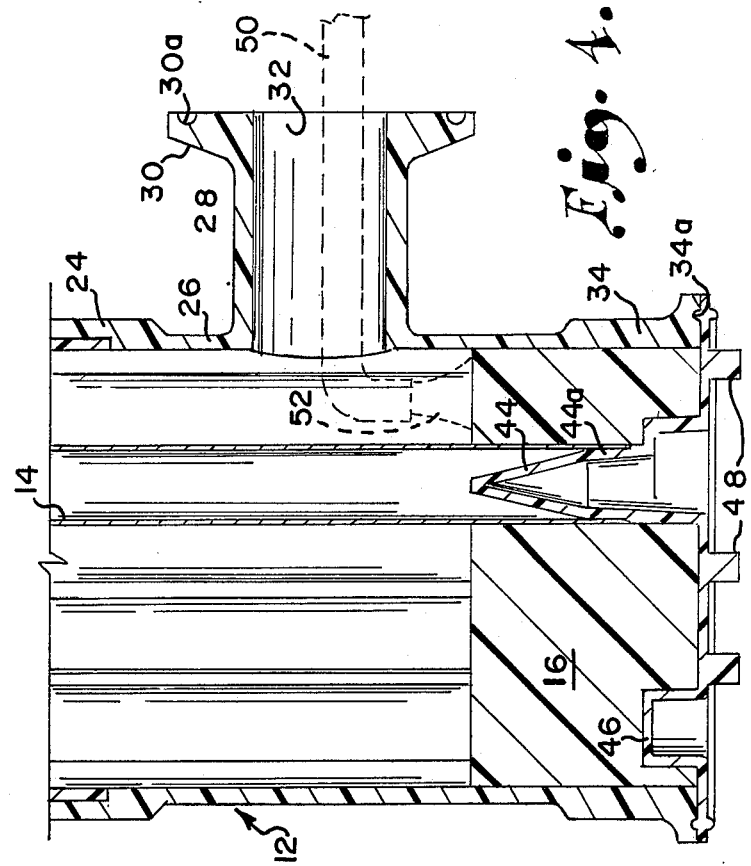
FIG. 3 is a vertical cross-sectional view of a portion of the mold shown in FIG. 1 as it would appear in conjunction with two associated ultra filtration tubules.

In cross-flow membrane filtration where the present invention finds particular applicability, a solid tubular filtration vessel is provided with a plurality of ultra filtration tubules which extend lengthwise of the vessel. These tubules are held in spaced apart relationship for passage of the feed stream therethrough. Oppositely extending inlet and outlet ports in the filtration vessel sidewall provide a passageway for permeate to pass out of the module. It is to be understood that a plurality of modules may be arranged in interconnected relationship, but in the interest of brevity only a single module will be described herein.

Referring initially to FIG. 5 of the drawings, a filtration module constructed according to the present invention is designated generally by the numeral 10. Module 10 includes an elongated generally cylindrical filtration vessel 12, a plurality of ultra filtration tubules 14, end plugs 16 and end plates 18.

Figure 4:
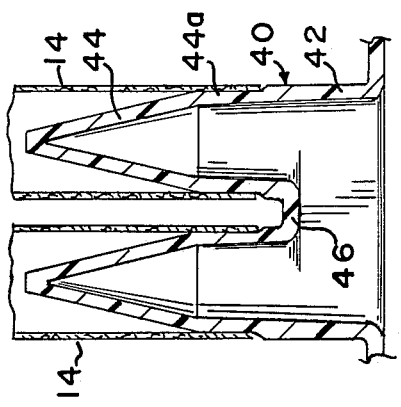
FIG. 4 is a vertical cross-sectional view taken along line 4—4 of FIG. 1 together with the vessel and tubules which form the filtration module.

With reference to FIGS. 4 and 5, vessel 12 comprises an elongated rigid cylindrical member 20 that is open-ended and includes end couplings 22. Each end coupling 22 is identical and includes an outwardly flared bell end for receiving one end of member 20. An appropriate adhesive or other bonding means is employed to rigidly secure the couplings 22 to the member 20. Bell end 24 of coupling 20 is integral with a cylindrical body portion 26 having an integral arm 28 which extends from the longitudinal axis of vessel 12 at an angle of 90°. Arm 28 has a flared end 30 which defines an opening 32 (FIG. 4). A groove 30a is provided in the outwardly facing surface of flared end 30. At the end of coupling body 26 opposite bell end 24 is outwardly flared and provided with a thickened wall section 34 to provide additional structural strength. A sealing groove 34a is provided in the end surface of the thickened wall 34.

Figure 1:
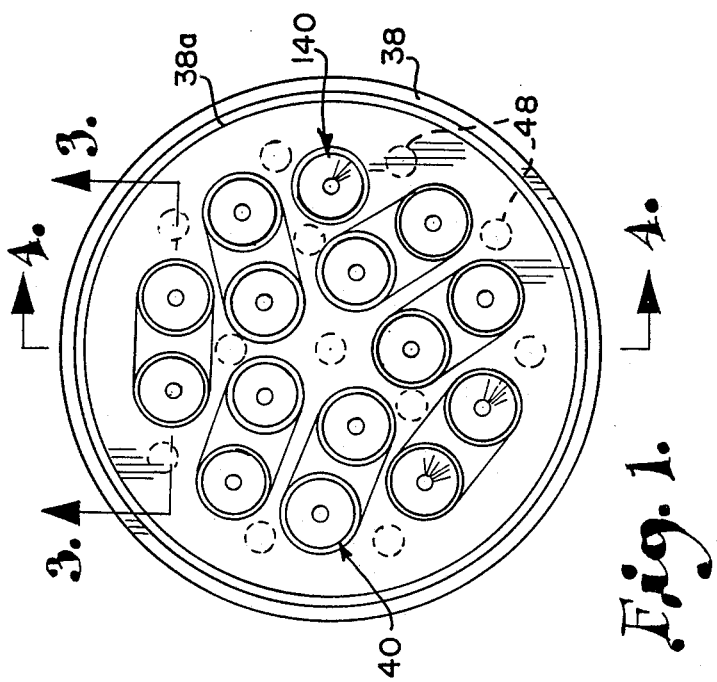
FIG. 1 is a top plan view of a mold for use in constructing a filtration module according to the present invention.
Figure 2:
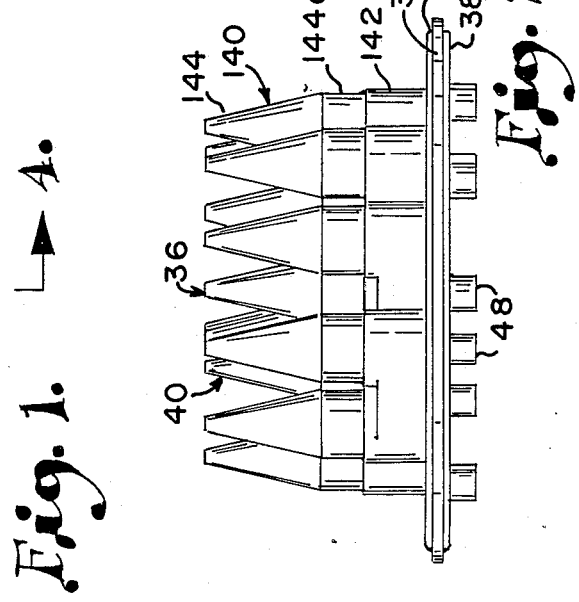
FIG. 2 is a side elevational view of the mold shown in FIG. 1.

With reference to FIGS. 1-3, the mold member which forms end plug 16 will now be described. It is to be understood, of course, that in the method of the present invention two mold members will be employed, but as they are identical only one will be described in detail at this time. A mold member is designated generally by the numeral 36 in FIG. 2 and includes a generally planar section 38 having opposed circumferentially extending sealing rings 38a and 38b. Integral with planar section 38 and extending therefrom at an acute angle are coupler components 40 one of which is shown in detail in FIG. 3. Each component 40 includes a generally cylindrical base portion 42 from which extends two integral generally conical sections 44 that are connected by a bight section 46. Each conical section 44 has a base end 44a which is generally cylindrical and is positioned immediately on top of base portion 42. As is apparent from viewing FIG. 3, the entire coupler component 40 is of an open or hollow construction.

A modified coupler component 140 (FIGS. 1 and 2) comprises a base portion 142 and a single conical section 144. Conical section 144 has a generally cylindrical base section 144a that is positioned immediately on top of base portion 142. Base portion 142 is substantially identical to the base portion 42 previously described except slightly less than half the diameter and conical section 144 is substantially identical to the section 44 previously described. There being only a single conical section 144 on base 142, there is no need for any component corresponding to bight section 46 of component 40. A plurality of tabs 48 extend from planar section 38 in the opposite direction from components 40 and 140 and provide means for grasping the mold to extract it from vessel 12 after use.

In carrying out the method of the present invention, vessel 12 is provided along with two mold members 36 which are sized to be received in the open ends of the vessel with a sealing ring 38a received in a groove 34a. After one mold member 36 has been placed in position, the ultra filtration tubules 14 (FIGS. 4 and 5) are positioned with one end being received by the conical sections 44 and 144. The tubules are sized to provide a close friction fit between the tubule and the base portion of the generally conically shaped sections 44 and 144 as best illustrated in FIG. 3. Once all of the tubules are in place, the second mold member 36 is brought into position to close the opposite end of vessel 12 in the same manner as previously described for tne first mold member. It should be noted that care is taken in positioning both mold members to align the single conical section 144 with the inlet tubule at one end and the outlet tubule at the opposite end.

Next, vessel 12 is oriented to a vertical position. As shown in FIG. 4, a nozzle 50 is positioned inside of vessel 12 through opening 32 and a moldable material 52 is injected through the nozzle into the bottom of the vessel. An epoxy resin is preferred for the moldable material because of its many desirable properties including bonding and compressive strengths, relatively fast hardening time and inert characteristics relative to most materials to which ultra filtration techniques are applied. Other moldable materials can, of course, be utilized. Material 52 is injected into the vessel until it completely covers mold member 36 and extends upwardly along the tubules 14 a sufficient distance to assure that a fluid tight seal will be formed when the material hardens Once material 52 hardens, an end plug 16 is presented. As best understood from viewing FIGS. 6, 7 and 8, end plug 16 partially presents a plurality of distinct unitary U-shaped conduit couplings 56 between adjacent pairs of tubules 14. Each coupling includes generally cylindrical leg sections 58 separated by a partition wall section 60 and joined together by a bight section 62. End plug 16 also surrounds inlet tubule 14 and presents an inlet opening 64 in communication therewith. After material 52 has hardened and end plug 16 has been formed, mold member 36 may be immediately removed or it may be left in place until the second end plug is formed and the two mold members removed substantially simultaneously.

In any case, after forming the first end plug, vessel 12 is oriented to a second vertical position wherein the two ends are rotated 180° from the first position previously described. Thus, the second end will be in the identical position shown in FIG. 4 for the first end and again a moldable material 52 is introduced into the bottom of the vessel through opening 32 by means of nozzle 50. The moldable material is again added so as to completely cover the second mold member 36 as well as the ends of tubules 14 over a sufficient portion of their length so as to assure formation of a fluid tight seal.

Material 52 is allowed to harden to present a second end plug 16 identical to the end plug previously described. In the case of the second end plug, the unitary opening 64 previously designated as an inlet opening serves as an outlet opening and is coupled with the outlet tubule 14. In this regard, it is to be noted that, by carefully selecting the spatial orientation of coupler components 40 in mold 36, and by rotating the position of the second mold member in the vessel approximately 15° relative to the rotational position of the first mold member in the opposite end of the vessel, the same mold configuration can be employed for both molds.

After the second end plug 16 has been formed, the second mold member 36 is removed from vessel 12. The exposed ends of the plugs 16 are then covered by first and second solid end plates 18. A gasket seal 66 of elastomeric material seats on the end surface of thickened wall section 34 and the end plate is held in place by conventional means such as an appropriate clamp (not shown). Each end plate 18 has an outwardly projecting nipple 68 which presents an opening 70 which registers with opening 64 and thus serves as either an inlet or an outlet opening depending upon which end of vessel 12 is involved. As best appreciated from viewing FIG. 7, each end plate 18 cooperates with an end plug 16 to complete the U-shaped conduit couplings 56 by providing an end wall or cover for each of the conduit bight sections 62.

In a typical installation, the feed stream of a fluid to be filtered enters vessel 12 through opening 70 at the right-hand side of FIG. 5 and passes through each of the individual tubules connected in series before ultimately passing out of the vessel as concentrate through the outlet opening presented by nipple 68 in the second and opposite end plate 18. Permeate exits vessel 12 through arm 28.

During utilization of module 10, the interior surface of the ultra filtration membrane will become clogged with foulants which will reduce the throughput of the module. To maintain maximum flow-through volume as well as the efficiency of the filtration process, small balls of sponge-like material 72 (FIGS. 5 and 7) are periodically introduced into the module to scour the inner membrane surface. Manifestly, the diameter of the sponge ball is carefully selected so that it will gently but effectively engage the inner surface of the tubule to scour it and remove foulants. Because of the unitary construction of the filtration module, the sponge balls 72 move through the filtration path with reduced danger of becoming trapped in one of the U-couplings 56 when compared with prior U-shaped connections for series arranged modules.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A method of preparing a filtration module which includes a plurality of filtration tubules coupled in series which tubules are cleanable by sponge ball scouring, said method comprising the steps of:
   providing a hollow elongated filtration vessel having first and second open ends and means for removing permeate therefrom;
   providing first and second mold members each being adapted to be received in one of said open ends and configured to present a mold for an end plug which presents a portion of a plurality of distinct unitary U-shaped couplings each of which couples an adjacent pair of said tubules in fluid tight relationship and is characterized by an absence of uneven surfaces which cause hang up of said sponge balls;
   placing open of said mold members in one of said ends;
   positioning a plurality of said filtration tubules in said vessel and joining said tubules with said one mold member;
   placing the other of said mold members in the other of said ends and joining said tubules with said second mold member;
   orienting said vessel to a vertical position;
   introducing a moldable material into the bottom end of said vessel to at least partially surround one of said mold members and said tubules;
   allowing said material to harden to present one of said end plugs;
   orienting said vessel to a second vertical position with the ends thereof rotated 180° from said first position;
   introducing a moldable material into the bottom end of said vessel when the latter is in said second vertical position to at least partially surround the other of said mold members and said tubules;
   allowing said material to harden to present the other of said end plugs;
   removing said mold members from the ends of said vessel; and
   covering the ends of said plugs with first and second end plates which complete said U-shaped couplings.

2. A method as set forth in claim 1, wherein said introducing step includes forming a fluid tight seal between said material and said tubules.

3. A method as set forth in claim 2, wherein said introducing step includes introducing an epoxy resin material.

4. A filtration module for use in cross flow ultra filtration and suitable for cleaning by sponge ball scouring, said module comprising:
   an elongated filtration vessel having first and second open ends and means for withdrawing permeate from the vessel;
   first and second unitary molded end plugs positioned in said open ends,
   said end plugs partially presenting a plurality of distinct unitary U-shaped couplings characterized by an absence of uneven surfaces which cause hang up of said sponge balls;
   a plurality of filtration tubules including an inlet tubule and an outlet tubule received in fluid tight relationship and held in spaced apart relationship by said end plugs;
   adjacent pairs of tubules, except for an inlet tubule and an outlet tubule, being coupled at both ends with a U-shaped coupling, said inlet tubule and said outlet tubule being coupled at one end with inlet and outlet openings, respectively, in said end plugs whereby all of said tubules are joined in series relationship; and
   first and second end plates coupled with said end plugs and cooperating with the latter to present said plurality of distinct U-shaped couplings.

5. A filtration module as set forth in claim 4, wherein one of said end plates has an inlet opening coupled with said inlet tubule and the other of said end plates has an outlet opening coupled with said outlet tubule.

6. A filtration module as set forth in claim 5 wherein said plugs comprise an epoxy resin.

* * * * *